(12) United States Patent
Malhotra et al.

(10) Patent No.: US 8,743,693 B2
(45) Date of Patent: Jun. 3, 2014

(54) METHOD FOR DYNAMICALLY ADJUSTING TOKEN BUCKET SIZES

(75) Inventors: Richa Malhotra, Twente (NL); Ronald Van Haalen, Nijmegen (NL)

(73) Assignee: Alcatel Lucent, Paris (FR)

(*) Notice: Subject to any disclaimer, the term of this patent is extended or adjusted under 35 U.S.C. 154(b) by 2079 days.

(21) Appl. No.: 11/239,757

(22) Filed: Sep. 30, 2005

(65) Prior Publication Data

US 2007/0076613 A1    Apr. 5, 2007

(51) Int. Cl.
*H04L 1/00* (2006.01)
*H04L 12/26* (2006.01)
*H04L 12/28* (2006.01)
*H04L 12/16* (2006.01)
*H04L 12/56* (2006.01)

(52) U.S. Cl.
CPC ............ *H04L 47/2441* (2013.01); *H04L 47/24* (2013.01); *H04L 47/10* (2013.01)
USPC ...................................... 370/235.1

(58) Field of Classification Search
USPC .............................. 370/220, 235.1
See application file for complete search history.

(56) References Cited

U.S. PATENT DOCUMENTS

| | | | |
|---|---|---|---|
| 5,400,329 A | 3/1995 | Tokura et al. | |
| 6,192,032 B1 * | 2/2001 | Izquierdo | 370/230 |
| 6,370,114 B1 | 4/2002 | Gullicksen et al. | |
| 6,438,101 B1 | 8/2002 | Kalampoukas et al. | |
| 6,643,259 B1 | 11/2003 | Borella et al. | |
| 6,925,060 B2 | 8/2005 | Mangin | |
| 6,934,251 B2 | 8/2005 | Ono | |
| 7,054,317 B1 | 5/2006 | Jung et al. | |
| 2002/0165754 A1 * | 11/2002 | Tang et al. | 705/9 |
| 2003/0086413 A1 | 5/2003 | Tartarelli et al. | |
| 2004/0071086 A1 | 4/2004 | Haumont et al. | |
| 2006/0045008 A1 * | 3/2006 | Sun et al. | 370/229 |

OTHER PUBLICATIONS

Heckmann, "The Token Bucket Allocation and Reallocation Problems", Dec. 2001, KOM Technical Report, all pages.*
Kidambi, Jayakrishna, "Dynamic Token Bucket (DTB): A Fair Bandwidth Allocation Algorithm for High-Speed Networks", 1999, IEEE, all pages.*
Sahu, "On Achievable Service Differentiation with Token Bucket Marking for TCP," Jun. 2000, Proc. ACM SIGMETRICS'00, Santa Clara, CA, all pages.*
C. Akinlar et al., "QoS Management in Residential Gateways," in Proceedings of Joint International Conference on Wireless LANs and Home Networks (ICWLHN 2002) and Networking (ICN 2002), Networks, Atlanta, USA, Aug. 2002.

* cited by examiner

*Primary Examiner* — Kwang B Yao
*Assistant Examiner* — Adam Duda
(74) *Attorney, Agent, or Firm* — Wall & Tong, LLP

(57) ABSTRACT

The invention includes a method for determining a maximum size of a token bucket. One method includes detecting a condition and determining the maximum token bucket size in response to the condition. The condition may include one of a packet drop and a reduction of a current token bucket size, an actual information rate satisfying a rate threshold, or a current token bucket size satisfying a size threshold. Another method includes detecting a packet drop, detecting a reduction of a current token bucket size, and determining the maximum token bucket size in response to the packet drop and the reduction of the current token bucket size. Another method includes detecting a condition and performing an initial bucket size adaptation in response to the condition where the initial bucket size adaptation has an initial adaptation rate greater than a subsequent adaptation rate associated with a subsequent bucket size adaptation.

8 Claims, 6 Drawing Sheets

100

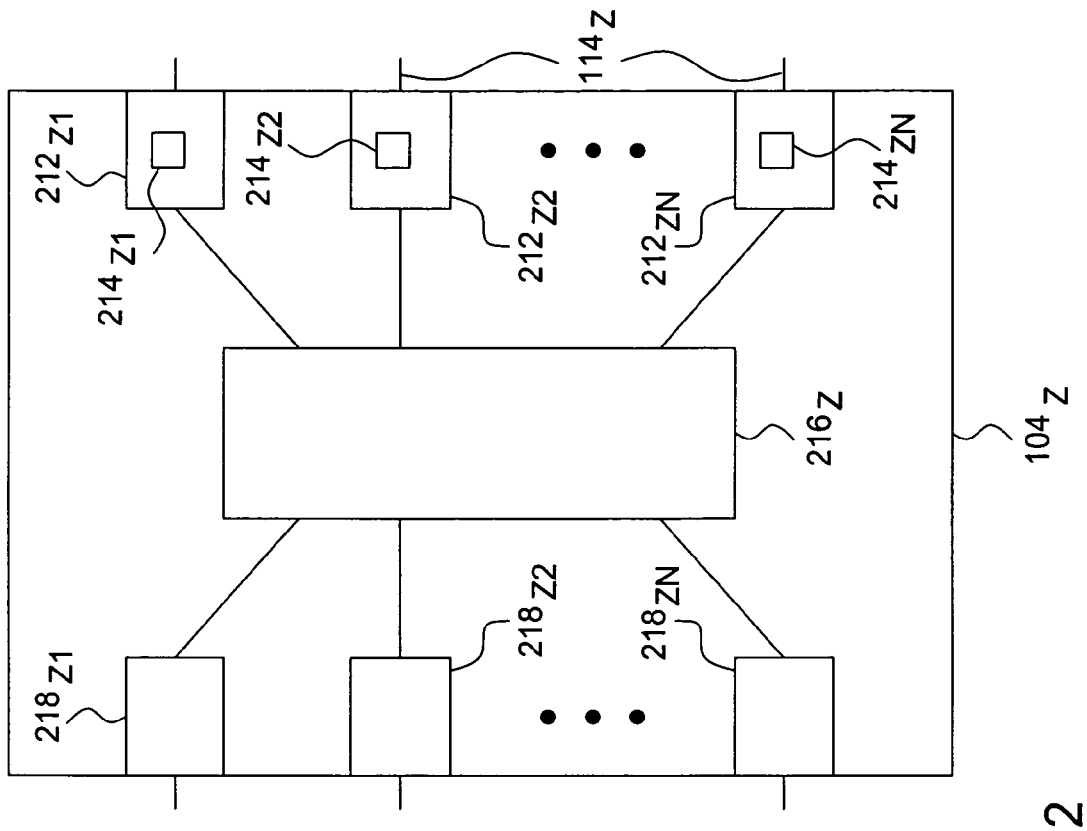
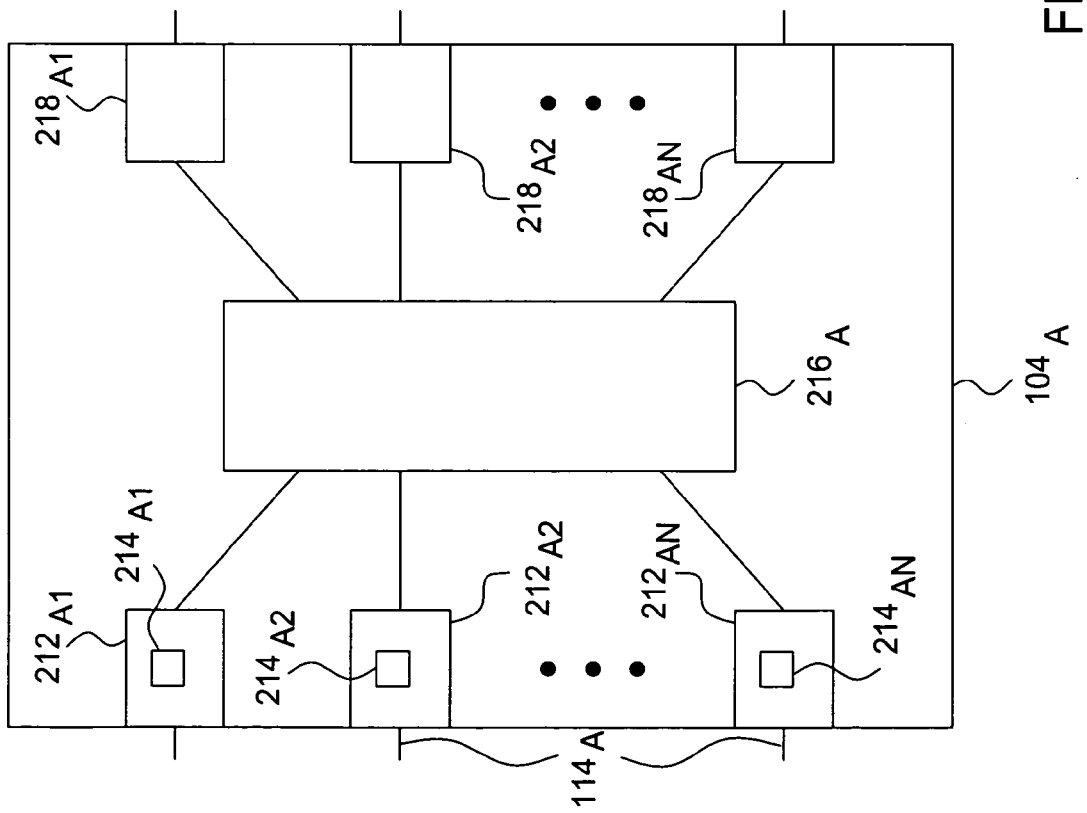
FIG. 2
200

METHOD FOR DYNAMICALLY ADJUSTING TOKEN BUCKET SIZES

FIELD OF THE INVENTION

The invention relates to the field of communication networks and, more specifically, to token bucket policing mechanisms.

BACKGROUND OF THE INVENTION

In general, Transmission Control Protocol (TCP) and User Datagram Protocol (UDP) are widely used for communications over Internet Protocol (IP) networks. In TCP/IP networks, TCP operates as a connectionless protocol providing flow control, congestion control, and error recovery mechanisms for maximizing end-to-end throughput. In UDP/IP networks, UDP operates as a connectionless protocol that provides limited error recovery functions, offering instead a direct way to send and receive datagrams over an IP network. As such, UDP has a greater tolerance for packet drops than TCP.

In such networks, network bandwidth is often sold using a service level agreement that specifies a peak information rate (PIR) at which a customer may transmit information across the network. As such, if a customer agrees to pay for transmitting at a particular traffic rate, the network operator providing delivery of the traffic ensures that the customer does not exceed the PIR. In existing systems, packets of a connection are immediately dropped when the sender of the connection exceeds the established PIR for the connection. In order to enforce the PIR, the incoming traffic rate on a port associated with the connection is monitored using a policing mechanism.

The PIR policing mechanism is typically implemented as a token bucket mechanism. In a token bucket mechanism, upon forwarding a packet, the number of tokens in the bucket is increased by the number of bytes in the packet, up to a maximum token bucket size. The packets arriving at the monitored port are forwarded if the token bucket size is less than the maximum token bucket size. The packets arriving at the monitored port are forwarded if the token bucket size is greater than or equal to the maximum token bucket size.

In particular, in TCP/IP networks, as transmissions below the PIR are successful, TCP transmission window size (denoted as WND) is increased until the associated sending rate reaches the PIR. Upon reaching this strict policing limit packets begin to be dropped. The packet drops cause TCP to substantially reduce the WND (i.e., by half), thereby causing a substantial reduction in the transmission rate. Since this process typically repeats continuously, TCP connections are unable to transmit at a rate equal to the PIR. In other words, the customer is paying for connections that transmit at the agreed PIR, the network operator provides enough bandwidth to support the agreed PIR, however, due to existing TCP dynamics, the agreed PIR is never achieved.

A first proposed solution is the use of large token bucket sizes in order to admit bursts of data; however, admission of such large bursts of data into the network requires extensive, expensive buffer space to accommodate the large data bursts. Furthermore, although TCP requires accommodation of large burst sizes, UDP does not require such accommodations of large burst sizes since packet drops do not affect UDP throughput. Moreover, UDP may unnecessarily flood the network with packets using the large token buckets. A second proposed solution is the use of a traffic shaper (i.e., a leaky bucket) in order to admit bursts of data; however, extensive, expensive buffer space is needed to buffer all packets.

SUMMARY OF THE INVENTION

Various deficiencies in the prior art are addressed through the invention of a method for determining a maximum size of a token bucket. One method includes detecting a condition and determining the maximum token bucket size in response to the condition. The condition may include one of a packet drop and a reduction of a current token bucket size, an actual information rate satisfying a rate threshold, or a current token bucket size satisfying a size threshold. Another method includes detecting a condition and increasing the maximum token bucket size in response to the condition. Another method includes detecting a packet drop associated with a connection, detecting a reduction of a current token bucket size, and determining the maximum token bucket size in response to the packet drop and the reduction of the current token bucket size. Another method includes detecting a condition and performing an initial bucket size adaptation in response to the condition where the initial bucket size adaptation has an initial adaptation rate greater than a subsequent adaptation rate associated with a subsequent bucket size adaptation.

BRIEF DESCRIPTION OF THE DRAWINGS

The teachings of the present invention can be readily understood by considering the following detailed description in conjunction with the accompanying drawings, in which:

FIG. 2 depicts a high-level block diagram of the access nodes of the communication network architecture of FIG. 1;

To facilitate understanding, identical reference numerals have been used, where possible, to designate identical elements that are common to the figures.

DETAILED DESCRIPTION OF THE INVENTION

The present invention is discussed in the context of an Internet Protocol (IP) network; however, the present invention can be readily applied to other networks and network topologies. The present invention provides dynamic burst-size control. The present invention maintains an optimal burst-size for preventing unnecessarily large bursts of data into the network. In one embodiment, dynamic burst-size control is implemented using a token bucket mechanism. In one such embodiment, dynamic burst-size control is implemented by dynamically adjusting an associated maximum token bucket size. By dynamically adjusting a maximum token bucket size (i.e., increasing the maximum token bucket size in response to various conditions and decreasing the maximum token bucket size in response to various conditions), an optimum information rate is maintained.

In accordance with the present invention, dynamic burst-size control is provided such that drop-insensitive streams (e.g., User Datagram Protocol (UDP) streams) are prevented from impacting the performance of drop-sensitive streams (e.g., Transmission Control Protocol (TCP) streams). In a system operating according to the present invention, drop-sensitive streams (e.g., TCP streams) achieve an actual information rate approximately equal to a peak information rate (i.e., the peak information rate set on a policing module controlling the token bucket mechanism). In a system operating according to the present invention, drop-insensitive streams (e.g., UDP streams) are prevented from bursting packets into the network. As such, the present invention adjusts policing restrictiveness according to the sensitivity of the information streams being policed.

Figure 1:
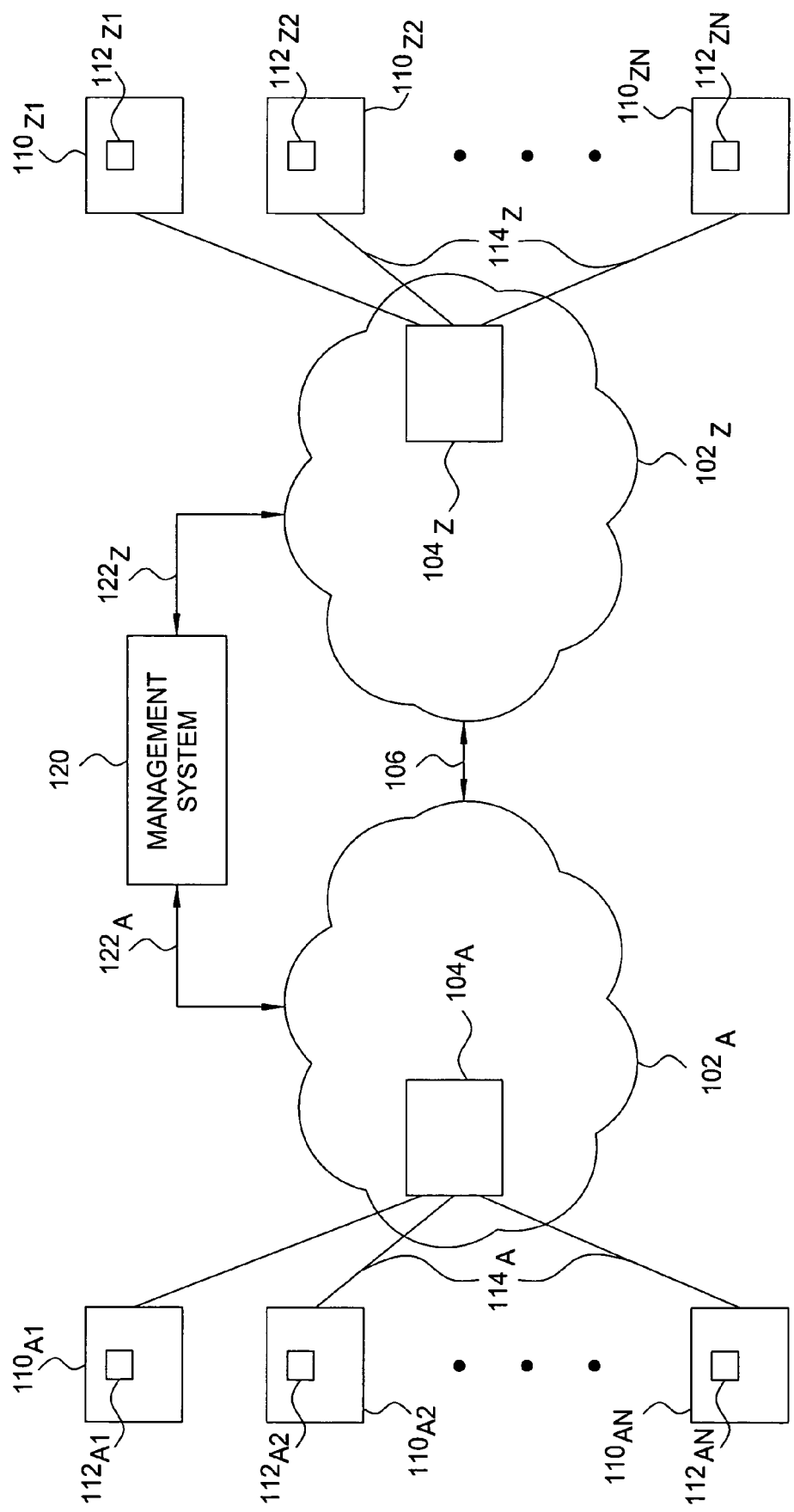
FIG. 1 depicts a high-level block diagram of a communications network architecture.

FIG. 1 depicts a high-level block diagram of a communications network architecture. In general, communications network architecture 100 of FIG. 1 comprises an IP communications network. In particular, communication network architecture 100 comprises a first $102_A$ and a second network $102_Z$ (collectively, networks 102). The first network $102_A$ includes an access node (AN) $104_A$ in communication with a plurality of terminal nodes (TNs) $110_{A1}$-$110_{AN}$ (collectively, TNs $110_A$) using a respectively plurality of access communication links (ACLS) $114_A$. The second network $102_Z$ includes an access node (AN) $104_Z$ in communication with a plurality of terminal nodes (TNs) $110_{Z1}$-$110_{ZN}$ (collectively, TNs $110_Z$) using a respectively plurality of access communication links (ACLS) $114_Z$. The ANs $104_A$ and $104_Z$ are collectively denoted as ANs 104. The TNs $110_A$ and $110_Z$ are collectively denoted as TNs 110.

As depicted in FIG. 1, networks 102 include any networks operable for supporting connections between TNs 110. For example, networks 102 may be IP networks for supporting packet connections (e.g., TCP connections, UDP connections, and the like) between TNs 110. In one embodiment, although not depicted, networks 102 may include various other network elements, network components, communication links, and the like. As depicted in FIG. 1, networks 102 communicate using a communication link 106. In one embodiment, although not depicted, communication between networks 102 may be performed using various combinations of networks, node, and associated communication links. As such, although not depicted, connections established between TNs 110 may traverse various other networks, network elements, and communication links, as well as various combinations thereof.

As depicted in FIG. 1, ANs 102 comprise access nodes operable for supporting connections between TNs 110. For example, ANs 104 may be routers adapted for routing packets (e.g., TCP segments, UDP datagrams, and the like) over IP networks using IP datagrams. Although not depicted in FIG. 1, AN $104_A$ includes at least one policing module for policing traffic transmitted from TNs $110_A$ using AN $104_A$ and AN $104_Z$ includes at least one policing module for policing traffic transmitted from TNs $110_Z$ using AN $104_Z$. In one embodiment, not depicted, each direction of transmission associated with a connection between TNs 110 may include a plurality of associated policing modules.

As depicted in FIG. 1, TNs 110 include network elements operable for exchanging information and presenting exchanged information using at least one display module. In one embodiment, in which networks 102 comprise IP networks, TNs 110 include IP phones, computers, and the like. In one embodiment, TNs 110 comprise connection endpoints. For full-duplex connections established between TNs 110, each TN comprises an endpoint of the connection operating as both a sender and receiver for the connection. The TN operates as a sender of information for the byte-stream transmitted from the TN towards a remote TN and a receiver of information for the byte-stream received by the TN from the remote TN.

For example, assume a TCP connection exists between TN $112_{A1}$, and TN $112_{Z2}$. In this example, TN $112_{A1}$ and TN $112_{Z2}$ comprise connection endpoints. In this example, TN $112_{A1}$ operates as a sender of the connection for information transmitted from TN $112_{A1}$ to TN $112_{Z2}$ and operates as a receiver of the connection for information received by TN $112_{A1}$ from TN $112_{Z2}$. Similarly, in this example, TN $112_{Z2}$ operates as a sender of the connection for information transmitted from TN $112_{Z2}$ to TN $112_{A1}$ and operates as a receiver of the connection for information received by TN $112_{Z2}$ from TN $112_{A1}$.

As depicted in FIG. 1, TNs $110_{A1}$-$110_{AN}$ include a respective plurality of processes $112_{A1}$-$112_{AN}$ (collectively, processes $112_A$) and TNs $110_{Z1}$-$110_{ZN}$ include a respective plurality of processes $112_{Z1}$-$112_{ZN}$ (collectively, processes $112_Z$). The processes $112_A$ and $112_Z$ are collectively denoted as processes 112. The processes 112 are operable for establishing connections for transmission of data over the networks 102. In one embodiment, TCP connections may be established between processes 112. Since processes 112 terminate such TCP connections, the end-to-end flow control and congestion control functions of TCP are implemented between processes of terminal nodes between which a connection is established, respectively.

In one embodiment, at least a portion of the functions of the present invention are performed by a management system (illustratively, management system (MS) 120). For example, in one embodiment, MS 120 is operable for determining a maximum token bucket size and providing the maximum token bucket size to a policing module for implementing the determined maximum token bucket size. In one embodiment, in which a maximum token bucket size is determined by an access node, at least a portion of the information used for determining the maximum token bucket size is obtained from MS 120. For example, a PIR may be obtained from an SLA stored on MS 120. As depicted in FIG. 1, MS 120 communicates with networks $102_A$ and $102_Z$, including ANs 104, and, optionally, TNs 110, using management communication links (MCLs) $122_A$ and $122_Z$ (collectively, MCLs 122), respectively.

In one embodiment, at least a portion of the functions of the present invention is performed by an access node. For example, in one embodiment, at least a portion of the functions of the present invention are performed by ANs 104. In one such embodiment, at least a portion of the functions of the present invention are performed by policing modules. For example, in one embodiment, at least a portion of the monitoring for identifying various conditions that trigger an adjustment of the maximum token bucket size is performed by policing modules associated with respective ports of ANs 104. For example, in one embodiment, at least a portion of the processing for determining the maximum token bucket size is performed by policing modules associated with respective ports of ANs 104. As such, access nodes $104_A$ and $104_Z$ are depicted and described herein with respect to FIG. 2.

FIG. 2 depicts a high-level block diagram of the access nodes of the communication network architecture 100 of FIG. 1. As depicted in FIG. 2, access node $104_A$ comprises a plurality of ingress ports $212_{A1}$-$212_{AN}$ (collectively, ingress ports $212_A$) coupled to a plurality of egress ports $218_{A1}$-$218_{AN}$ (collectively, egress ports $218_A$) by a routing module $216_A$. As depicted in FIG. 2, access node $104_Z$ comprises a plurality of ingress ports $212_{Z1}$-$212_{ZN}$ (collectively, ingress ports $212_Z$)

coupled to a plurality of egress ports $218_{Z1}$-$218_{ZN}$ (collectively, egress ports $218_Z$) by a routing module $216_Z$.

As depicted and described herein with respect to FIG. 1, ANs $104_A$ and $104_Z$ receive data from TNs $110_A$ and $110_Z$ using ACLs $114_A$ and $114_Z$, respectively, and transmit the data towards the networks 102. Similarly, as depicted and described herein with respect to FIG. 1, ANs $104_A$ and $104_Z$ receive data from the networks 102 and transmit the data towards TNs $110_A$ and $110_Z$, respectively. As such, as depicted in FIG. 2, ingress ports $212_A$ and $212_Z$ receive data from TNs $110_A$ and $110_Z$ using ACLs $114_A$ and $114_Z$, respectively, and transmit the data towards the networks 102. Similarly, as depicted in FIG. 2, egress ports $218_A$ and $218_Z$ receive data from the networks 102 and transmit the data towards TNs $110_A$ and $110_Z$, respectively.

As depicted in FIG. 2, ingress ports $212_{A1}$-$212_{AN}$ comprise a respective plurality of policing modules $214_{A1}$-$214_{AN}$ (collectively, policing modules $214_A$) and ingress ports $212_{Z1}$-$212_{ZN}$ comprise a respective plurality of policing modules $214_{Z1}$-$214_{ZN}$ (collectively, policing modules $214_Z$). The policing modules $214_A$ and $214_Z$ are collectively referred to as policing modules 214. In one embodiment, a policing module comprises a token bucket mechanism. In general, a token bucket may be used for enforcing a peak information rate. In one embodiment, since a peak information rate may be associated with a customer utilizing numerous connections, a token bucket associated with a port may be used for contemporaneously monitoring the peak information rate associated with a plurality of connections carried over the port.

In order to enforce the peak information rate, incoming traffic rate on a port is monitored using the token bucket. Upon forwarding of a packet, the number of tokens in the token bucket (i.e., token bucket size) is adjusted by the number of bytes in the packet. In one embodiment, in which the token bucket is initialized to zero, the token bucket size is increased in response to forwarding of a packet, and packets arriving at the port are forwarded as long as the token bucket size is less than a configured maximum bucket size. In another embodiment, in which the token bucket size is initialized to a maximum bucket size, the token bucket size is decreased in response to forwarding of a packet, and packets arriving at the port are forwarded as long as the token bucket is not empty (i.e., as long as the token bucket size is greater than zero).

In one embodiment, policing modules 214 are adapted in accordance with the present invention for determining a maximum token bucket size. In one embodiment, policing modules 214 are adapted for detecting at least one condition and adjusting the maximum token bucket size in response to detecting the at least one condition. In one such embodiment, policing modules 214 are adapted for increasing the maximum token bucket size in response to detecting the at least one condition. In one such embodiment, policing modules 214 are adapted for decreasing the maximum token bucket size in response to detecting the at least one condition. In one further embodiment, policing modules 214 are adapted for periodically decreasing the maximum token bucket size in order to determine whether a desired actual information rate is maintainable at the decreased maximum token bucket size.

In accordance with the present invention, by adjusting (i.e., increasing and decreasing) the maximum token bucket size in response to various conditions, policing modules 214 maintain a desired actual information rate. In one embodiment, the desired actual information rate is an optimum actual information rate. In one embodiment, an optimum actual information rate is an actual information rate approaching the peak information rate. As such, in one embodiment in accordance the present invention, policing modules 214 are adapted for maintaining the actual information rate within a particular range (e.g., maintaining the actual information rate such that the actual information rate is greater than 90% of the peak information rate and less than 95% of the peak information rate).

Figure 3:
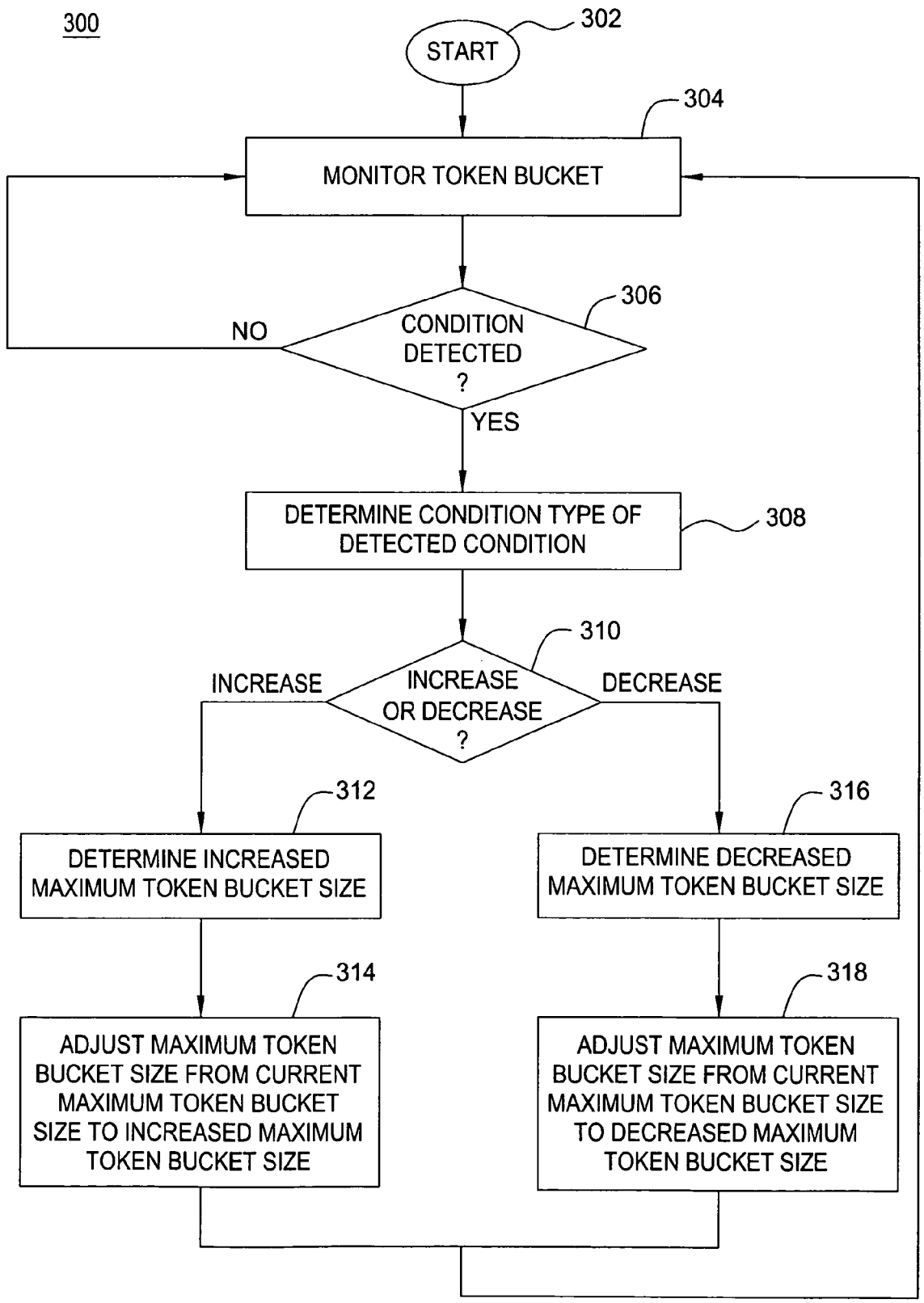
FIG. 3 depicts a flow diagram of a method according to one embodiment of the invention.

FIG. 3 depicts a flow diagram of a method according to one embodiment of the invention. Specifically, method 300 of FIG. 3 comprises a method for determining a maximum token bucket size. Although depicted and described with respect to a token bucket policing a single connection, method 300 of FIG. 3 may be used for adjusting token buckets policing a plurality of connections. Although depicted as being performed serially, those skilled in the art will appreciate that at least a portion of the steps of method 300 may be performed contemporaneously, or in a different order than presented in FIG. 3. The method 300 begins at step 302 and proceeds to step 304.

At step 304, a token bucket is monitored. In one embodiment, the token bucket is monitored for detecting a condition. In one embodiment, the condition comprises a condition indicative that the maximum token bucket size should be adjusted. In one embodiment, the condition comprises a condition indicative that the maximum token bucket size should be increased. In one embodiment, the condition comprises a condition indicative that the maximum token bucket size should be decreased. In one embodiment, adjustment of a maximum token bucket size is performed in response to a combination of various conditions.

In one embodiment, the condition comprises an actual information rate associated with a connection crossing a threshold. In one embodiment, the condition comprises an actual information rate associated with the connection being less than a threshold. In one embodiment, the condition comprises an actual information rate associated with the connection being greater than a threshold. In such embodiments, the threshold comprises one of a peak information rate associated with the connection, a percentage of a peak information rate associated with the connection, a predetermined value, and the like, as well as various combinations thereof.

In one embodiment, the condition comprises a token bucket size crossing a threshold. In one embodiment, the condition comprises a token bucket size being less than a threshold. In one embodiment, the condition comprises a token bucket size being greater than a threshold. In such embodiments, the threshold comprises one of a maximum token bucket size, a percentage of a maximum token bucket size, a predetermined value, and the like, as well as various combinations thereof.

In one embodiment, adjustment of a maximum token bucket size is performed in response to a combination of various conditions. In one such embodiment, the detected condition comprises a combination of a packet drop and a reduction of a current token bucket size. For example, the current token bucket size may be reduced to zero in response to a packet drop. In this example, detection of the packet drop, followed by a reduction of the current token bucket size to zero, may trigger an adjustment of the maximum token bucket size to an increased maximum token bucket size (where the increased maximum token bucket size is greater than the original maximum token bucket size).

At step 306, a determination is made as to whether a condition is detected. If a condition is not detected, method 300 returns to step 304 (i.e., the token bucket is continuously monitored for various conditions as well as combinations thereof). If a condition is detected, method 300 proceeds to step 308. At step 308, a condition type of the detected condition is determined. At step 310, a determination is made as to whether the detected condition is indicative of an increase of the maximum token bucket size or a decrease of the maximum token bucket size. If the condition is indicative of an increase of the maximum token bucket size, method 300 proceeds to step 312. If the condition is indicative of a decrease of the maximum token bucket size, method 300 proceeds to step 316.

In one embodiment, a first condition type is indicative that the maximum token bucket size should be increased. In one such embodiment, a first condition type may include a combination of a packet drop and a reduction of the current token bucket size. In one such embodiment, a first condition type may include an actual information rate associated with a connection satisfying a first rate threshold (e.g., the actual information rate of a connection being less than the first rate threshold, where the first rate threshold is determined using the peak information rate associated with the connection). In one such embodiment, a first condition type may include a current token bucket size satisfying a first size threshold. In one embodiment, a second condition type is indicative that the maximum token bucket size should be decreased. In one such embodiment, a second condition type may include an actual information rate associated with a connection satisfying a second rate threshold.

At step 312, an increased maximum token bucket size is determined. In one embodiment, an increased maximum token bucket size is determined for a condition in which the actual information rate associated with a connection is less than a threshold. In one embodiment, an increased maximum token bucket size is determined for a condition in which the maximum token bucket size crosses a threshold (e.g., the token bucket size reaches the maximum token bucket size). In one embodiment, an increased maximum token bucket size is determined for a condition in which a packet drop is detected and a reduction of the current token bucket size is detected.

At step 314, the maximum token bucket size is increased from the current maximum token bucket size to the increased maximum token bucket size. Although primarily depicted and described herein as determining the new maximum token bucket size to which the current maximum token bucket size is increased, in one embodiment, a token bucket increment size is determined in response to a condition. In this embodiment, the current maximum token bucket size is increased by the increment size, thereby resulting in the increased maximum token bucket size. The method 300 then returns to step 304 at which point the token bucket continues to be monitored.

At step 316, a decreased maximum token bucket size is determined. In one embodiment, a decreased maximum token bucket size is determined for a condition in which the actual information rate associated with a connection is greater than a threshold. In one embodiment, a decreased maximum token bucket size is determined for a condition in which the maximum token bucket size crosses a threshold (e.g., the token bucket size falls below a percentage of the maximum token bucket size, e.g., below ninety percent of the maximum token bucket size).

In one embodiment, a decreased maximum token bucket size is determined periodically for determining whether the actual information rate associated with a connection is maintainable using a smaller token bucket size. In one embodiment, the maximum token bucket size is periodically decreased until a condition is satisfied. In one such embodiment, the condition is the actual information rate being below a threshold, where the threshold is a percentage of a peak information rate associated with the connection In one embodiment, the maximum token bucket size is periodically decreased to an i-th evaluation maximum token bucket size in an i-th reduction round (such that the maximum token bucket size in the (i-1)-th round is less than the token bucket size in the i-th round. In one embodiment, the maximum token bucket size is increased in response to a determination that the condition is satisfied.

At step 318, the maximum token bucket size is decreased from the current maximum token bucket size to the decreased maximum token bucket size. Although primarily depicted and described herein as determining the new maximum token bucket size to which the current maximum token bucket size is decreased, in one embodiment, a token bucket decrement size is determined in response to a condition. In this embodiment, the current maximum token bucket size is decreased by the decrement size, thereby resulting in the decreased maximum token bucket size. The method 300 then returns to step 304 at which point the token bucket continues to be monitored.

Figure 4:
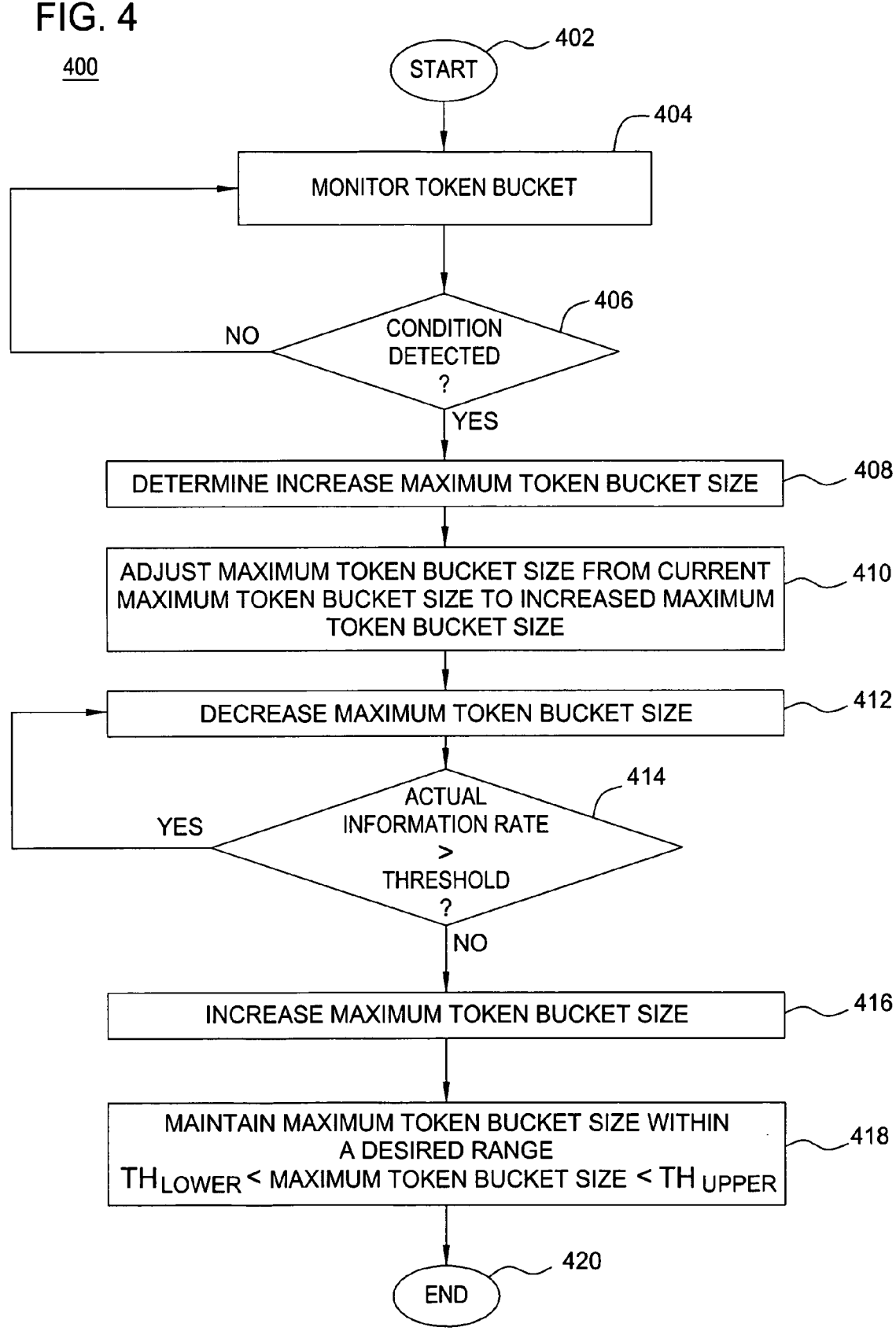
FIG. 4 depicts a flow diagram of a method according to one embodiment of the invention.

FIG. 4 depicts a flow diagram of a method according to one embodiment of the invention. Specifically, method 400 of FIG. 4 comprises a method for determining a maximum token bucket size. Although depicted and described with respect to a token bucket policing a single connection, method 400 of FIG. 4 may be used for adjusting token buckets policing a plurality of connections. Although depicted as being performed serially, those skilled in the art will appreciate that at least a portion of the steps of method 400 may be performed contemporaneously, or in a different order than presented in FIG. 4. The method 400 begins at step 402 and proceeds to step 404.

At step 404, a token bucket is monitored. In one embodiment, the token bucket is monitored for detecting a condition. In one embodiment, the condition comprises a condition indicative that the maximum token bucket size should be increased. At step 406, a determination is made as to whether a condition is detected. If a condition is not detected, method 400 returns to step 404 (i.e., the token bucket is continuously monitored for various conditions, as well as combinations thereof). If a condition is detected, method 400 proceeds to step 408. At step 408, an increased maximum token bucket size is determined. At step 410, the maximum token bucket size is increased from the current maximum token bucket size to the increased maximum token bucket size.

At step 412, the maximum token bucket size is decreased. At step 414, a determination is made as to whether the actual information rate associated with a connection is greater than a threshold. In one embodiment, the threshold comprises one of a peak information rate associated with the connection, a percentage of a peak information rate associated with the connection, a predetermined value, and the like. If the actual information rate of the connection is greater than the threshold, method 400 returns to step 412, at which point the maximum token bucket size is further decreased. If the actual information rate of the connection is less than the threshold, method 400 proceeds to step 416.

At step 416, the maximum token bucket size is increased. In other words, the maximum token bucket size is periodically decreased in steps until a determination is made that the actual information rate is below the threshold, at which point the maximum token bucket size is increased. As such, the maximum token bucket size is periodically decreased in steps for determining whether the actual information rate associated with a connection may be maintained above a threshold using a smaller maximum token bucket size. In one embodiment, the maximum token bucket size is increased according to one of a percentage of the maximum token bucket size at which the actual information rate crosses the threshold, a predetermined value, and the like.

At step 418, the actual information rate associated with a connection is maintained within a desired actual information rate range. In one embodiment, the actual information rate associated with a connection is maintained within a desired actual information rate range using at least a portion of the methodologies of the present invention. In one such embodiment, the actual information rate associated with a connection is maintained within a desired actual information rate range by dynamically adjusting the maximum token bucket size in response to conditions indicative that the actual information rate is outside of (or approaching a rate outside of) the desired actual information rate range. The method 400 then proceeds to step 420 where method 400 ends.

In one embodiment, the desired actual information rate range for the actual information rate includes a lower threshold and upper threshold (i.e., such that $TH_{AIR\text{-}LOWER} < ACTUAL\ INFORMATION\ RATE < TH_{AIR\text{-}UPPER}$). In one embodiment, the actual information rate is maintained within the desired actual information rate range using dynamic adjustment of the maximum token bucket size in accordance with the present invention. In one embodiment, the actual information rate is maintained within the desired actual information rate range by maintaining the maximum token bucket size within a desired maximum token bucket size range. In one embodiment, the desired maximum token bucket size range for the maximum token bucket size includes a lower threshold and upper threshold (i.e., such that $TH_{MTBS\text{-}LOWER} < ACTUAL\ INFORMATION\ RATE < TH_{MTBS\text{-}UPPER}$).

Figure 5:
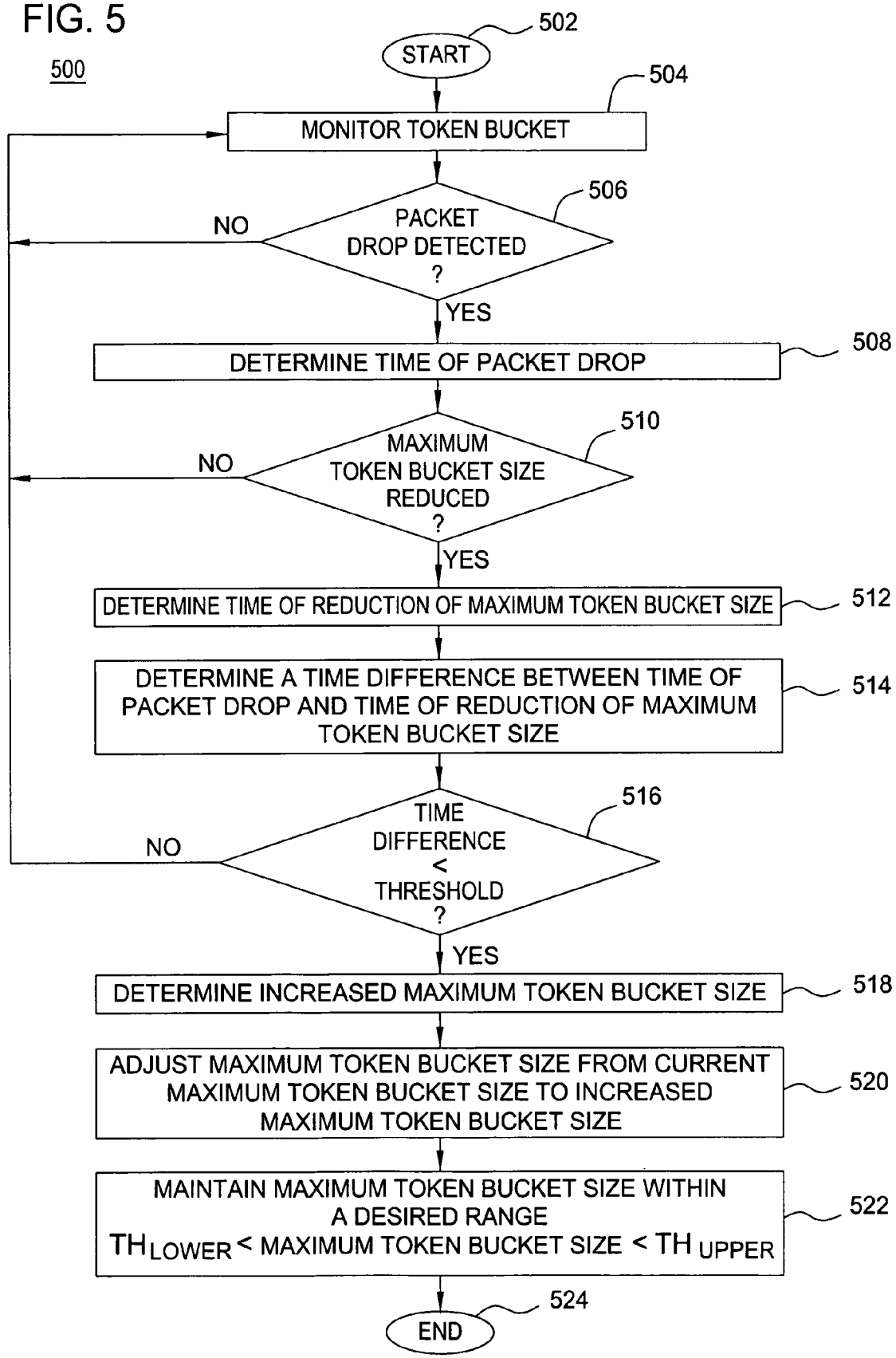
FIG. 5 depicts a flow diagram of a method according to one embodiment of the invention.

FIG. 5 depicts a flow diagram of a method according to one embodiment of the invention. Specifically, method 500 of FIG. 5 comprises a method for determining a maximum token bucket size. Although depicted and described with respect to a token bucket policing a single connection, method 500 of FIG. 5 may be used for adjusting token buckets policing a plurality of connections. Although depicted as being performed serially, those skilled in the art will appreciate that at least a portion of the steps of method 500 may be performed contemporaneously, or in a different order than presented in FIG. 5. The method 500 begins at step 502 and proceeds to step 504.

At step 504, a token bucket is monitored. At step 506, a determination is made as to whether a packet drop is detected. If a packet drop is not detected, method 500 returns to step 504 (i.e., the token bucket is continuously monitored for various conditions, as well as combinations thereof). If a packet drop is detected, method 500 proceeds to step 508. At step 508, the time at which the packet drop occurred is determined. At step 510, a determination is made as to whether the current token bucket size is reduced. If the current token bucket size is not reduced, method 500 returns to step 504 (i.e., the token bucket is continuously monitored for various conditions, as well as combinations thereof). If the current token bucket size is reduced, method 500 proceeds to step 512. At step 512, the time at which the reduction of the current token bucket size occurred is determined.

At step 514, a time difference (i.e., between the time at which the packet drop occurred and the time at which the reduction of the current token bucket size occurred) is determined. At step 516, a determination is made as to whether the time difference is less than a threshold (e.g., one second, two seconds, five seconds, and the like). If the time difference is not less than the threshold, method 500 returns to step 504 (i.e., the token bucket is continuously monitored for various conditions, as well as combinations thereof). If the time difference is less than the threshold, method 500 proceeds to step 518.

In one embodiment, the time difference, as well as the associated threshold, is dependent on at least one of the current token bucket size, the maximum token bucket size, a peak information rate, and the like, as well as various combinations thereof. In one embodiment, the threshold is dependent on both maximum token bucket size and peak information rate. For example, once the token bucket becomes full (i.e., the current token bucket size equals the maximum token bucket size) and detection of a packet drop triggers a reduction of the current token bucket size, the current token bucket size is reduced at a rate equal to the peak information rate. As such, since the token bucket size is reduced from the maximum token bucket size to a decreased token bucket size at a rate proportional to the peak information rate, the threshold is dependent on both the maximum token bucket size and the peak information rate.

In one such embodiment, the threshold used for determining whether the maximum token bucket size is increased is set to a value greater than or equal to the length of time required to reduce the current token bucket size from the maximum token bucket size (i.e., at which the packet drop condition is detected) to a reduced token bucket size (where $0 \leq REDUCED\ TOKEN\ BUCKET\ SIZE < MAXIMUM\ TOKEN\ BUCKET\ SIZE$). For example, in one embodiment, the threshold used for determining whether the maximum token bucket size is increased (i.e., the determination performed in step 516 of method 500) is set to a value greater than or equal to the length of time required to completely empty the token bucket from the maximum token bucket size (i.e., at which the packet drop condition is detected) to zero.

In one embodiment, since maximum token bucket size is dynamically adjusted in accordance with the present invention, the threshold used for determining whether a maximum token bucket size adjustment algorithm is executed (i.e., for determining whether to increase or decrease the maximum token bucket size) may be dynamically adjusted as the maximum token bucket size is adjusted. For example, for a maximum token bucket size of 2 Mb and a peak information rate of 2 Mbps, the threshold may initially be set to 1 second. In continuation of this example, assuming a detected condition results in an increase of the maximum token bucket size from 2 Mb to 4 Mb, the threshold may be adjusted from 1 second to 2 seconds (assuming the peak information rate remains 2 Mbps). As such, in one embodiment, the threshold increases and decreases as the maximum token bucket size increase and decreases.

In another embodiment, the threshold is determined as a percentage of traffic not affected by the packet drop condition(s). For example, assuming the maximum token bucket size is 2 Mb and the peak information rate is 2 Mbps, the threshold may be set to 2 seconds (rather than setting the threshold to 1 second). In this example, setting the threshold equal to 2 second provides an indication that half of the traffic may comprise traffic that is not affected by the packet drop condition(s). As in various other embodiments, the determination of the threshold in this embodiment may be determined using the maximum token bucket size and the peak information rate (or a percentage of a factor determined using the maximum token bucket size and the peak information rate).

In one embodiment, a counter is used for determining whether the proximity between a packet drop and a reduction of the maximum token bucket size warrants an increase of the maximum token bucket size. In one such embodiment, rather than determining the time at which the packet drop occurred, a counter is started in response to a packet drop. In one such embodiment, the counter is stopped in response to a reduction of the maximum token bucket size. In one such embodiment, the value of the counter is compared to the threshold in order to determine whether the maximum token bucket size should be increased.

At step 518, an increased maximum token bucket size is determined. In one embodiment, the increased maximum token bucket size is greater than the maximum token bucket size at the time at which the packet drop is detected. At step 520, the maximum token bucket size is increased from the current maximum token bucket size to the increased maximum token bucket size. As such, a combination of a packet drop and a reduction of the maximum token bucket size may be indicative that the current maximum token bucket size is not large enough to enable the actual information rate to achieve the peak information rate expected for the connection.

At step 522, the actual information rate associated with a connection is maintained within a desired actual information rate range. In one embodiment, the actual information rate associated with a connection is maintained within a desired actual information rate range using at least a portion of the methodologies of the present invention. In one such embodiment, the actual information rate associated with a connection is maintained within a desired actual information rate range by dynamically adjusting the maximum token bucket size in response to conditions indicative that the actual information rate is outside of (or approaching a rate outside of) the desired actual information rate range, as depicted and described herein with respect to FIG. 4. The method 500 then proceeds to step 524 where method 500 ends.

In accordance with the present invention, determination of a maximum token bucket size may be performed in various manners. In one embodiment, the maximum token bucket size may be adjusted according to a predetermined value (e.g., to a predetermined size, by a predetermined amount, and the like), according to a previous maximum token bucket size (e.g., computed as a percentage of a previous maximum token bucket size), according to a connection parameter (e.g., according to an actual information rate, according to a peak information rate, according to a transmission window size, and the like), and the like, as well as various combinations thereof. In one embodiment, various combinations of maximum token bucket size adjustment computation methods may be used for maintaining the maximum token bucket size within a desired maximum token bucket size range.

In one embodiment, an initial bucket size adaptation is performed. In one embodiment, an initial bucket size adaptation is performed in response to detection of a condition. In one embodiment, a subsequent bucket size adaptation is performed after the initial bucket size adaptation. In one such embodiment, an initial adaptation rate associated with the initial bucket size adaptation is greater than a subsequent adaptation rate associated with a subsequent bucket size adaptation performed after the initial bucket size adaptation. In one embodiment, the initial bucket size adaptation includes increasing the maximum size of a token bucket and the subsequent bucket size adaptation includes decreasing the maximum size of the token bucket. In another embodiment, the initial bucket size adaptation includes decreasing the maximum size of the token bucket and the subsequent bucket size adaptation includes increasing the maximum size of the token bucket.

For example, in one embodiment, the maximum token bucket size is increased in response to detection of a condition. In this example, the increase of the maximum token bucket size may be implemented as a single step from a first maximum token bucket size to a second token bucket size greater than the first token bucket size. In continuation of this example, the maximum token bucket size may then be decreased (e.g., the maximum token bucket size may be periodically decreased until a condition is satisfied). In a similar example, the maximum token bucket size is decreased in to detection of a condition. In this example, the maximum token bucket size may then be periodically increased until a condition is satisfied. Although specific examples have been described herein, those skilled in the art will appreciate that various other combinations of bucket size adaptations may be employed for satisfying various combinations of condition.

As such, in accordance with the present invention, a token bucket is configured such that the maximum token bucket size (MTBS) is initialized to an initial MTBS. In response to various conditions, the MTBS may either be increased from the initial MTBS to a maximum MTBS or decreased from the initial MTBS to a minimum MTBS. As such, using various combinations of MTBS increasing methodologies and MTSB decreasing methodologies, the MTBS is maintained at an optimum MTBS, where the optimum MTSB is equal to or greater than the minimum MTBS and equal to or less than the maximum MTBS.

Figure 6:
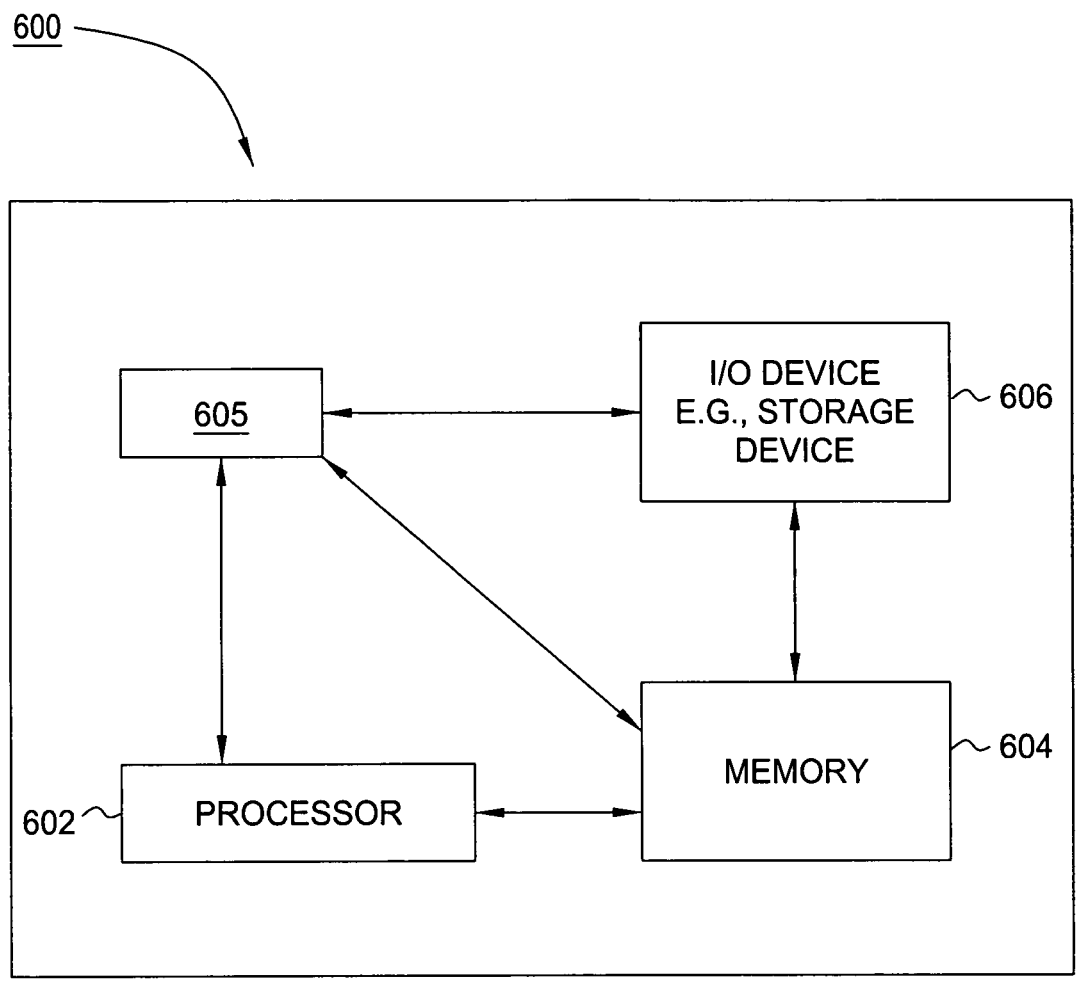
FIG. 6 depicts a high-level block diagram of a general-purpose computer suitable for use in performing the functions described herein.

FIG. 6 depicts a high-level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a maximum token bucket size determination/adjustment module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present maximum token bucket size determination/adjustment module or process 605 can be loaded into memory 604 and executed by processor 602 to implement the functions as discussed above. As such, maximum token bucket size determination/adjustment process 605 (including associated data structures) of the present invention can be stored on a computer readable medium or carrier, e.g., RAM memory, magnetic or optical drive or diskette and the like.

Although described herein with respect to determining a maximum token bucket size, in one embodiment, adjustment of the maximum token bucket size from a current maximum token bucket size to a new (i.e., increased or decreased) maximum token bucket size may be performed without an explicit determination of the new maximum token bucket size. In one such embodiment, the maximum token bucket size is adjusted in response to the various conditions which trigger maximum token bucket size adjustments (i.e., the determination of the maximum token bucket size is implicit).

Although primarily described herein with respect to one connection, in one embodiment, the methodologies of the present invention may be extended for use with token buckets policing a plurality of connections. Although primarily described herein with respect to one token bucket, in one embodiment, the methodologies of the present invention may be extended for use with a plurality of token buckets.

Although various embodiments which incorporate the teachings of the present invention have been shown and described in detail herein, those skilled in the art can readily devise many other varied embodiments that still incorporate these teachings.

What is claimed is:

1. A method for adjusting a maximum token bucket size of a token bucket at a network node, comprising:
   detecting a packet drop at the network node;
   detecting a reduction of a current token bucket size of the token bucket; and
   adjusting the maximum token bucket size in response to the packet drop and the reduction of the current token bucket size.

2. The method of claim 1, further comprising:
   determining a first time associated with the packet drop;
   determining a second time associated with the reduction of the current token bucket size; and
   determining a difference between the first time and the second time; and
   determining the maximum token bucket size in response to a determination that the difference between the first time and the second time satisfies a threshold.

3. The method of claim 2, wherein the threshold is determined using a previous maximum token bucket size and a peak information rate.

4. The method of claim 2, wherein the maximum token bucket size is determined using at least one of a predetermined value, a current maximum token bucket size, an actual information rate associated with a connection, or a peak information rate associated with the connection.

5. The method of claim 1, wherein adjusting the maximum token bucket size comprises:
   increasing the maximum token bucket size.

6. The method of claim 5, further comprising:
   decreasing the maximum token bucket size.

7. The method of claim 6, wherein decreasing the maximum token bucket size comprises:
   (a) decreasing the maximum token bucket size to an evaluation maximum token bucket size;
   (b) determining whether the evaluation maximum token bucket size satisfies a condition;
   (c) repeating steps (a) and (b) until the evaluation maximum token bucket size satisfies the condition; and
   (d) increasing the maximum token bucket size in response to a determination that the evaluation maximum token bucket size satisfies the condition.

8. An apparatus for adjusting a maximum token bucket size of a token bucket, comprising:
   a processor configured for:
   detecting a packet drop;
   detecting a reduction of a current token bucket size of the token bucket; and
   adjusting the maximum token bucket size in response to the packet drop and the reduction of the current token bucket size.

* * * * *